US005941479A

United States Patent [19]

Sunne et al.

[11] Patent Number: 5,941,479

[45] Date of Patent: Aug. 24, 1999

[54] VEHICLE HAVING A CERAMIC RADOME AFFIXED THERETO BY A COMPLAINT METALLIC "T"-FLEXURE ELEMENT

[75] Inventors: Wayne L. Sunne; Peter A. Nagy; Edward B. Liguori, all of Tucson, Ariz.

[73] Assignee: Raytheon Company, Lexington, Mass.

[21] Appl. No.: 09/121,134

[22] Filed: Jul. 22, 1998

Related U.S. Application Data

[63] Continuation of application No. 08/710,051, Sep. 10, 1996, Pat. No. 5,884,864, and a continuation of application No. 08/711,637, Sep. 10, 1996, and a continuation of application No. 08/709,929, Sep. 9, 1996, Pat. No. 5,758,845.

[51] Int. Cl.$^6$ ........ B64C 1/10

[52] U.S. Cl. ........ 244/121; 244/129.3; 244/131

[58] Field of Search ........ 244/129.3, 131, 244/132, 121, 133, 117 R, 119; 75/134 N; 343/872; 428/606, 432; 228/124.5

[56] References Cited

U.S. PATENT DOCUMENTS

| | | | |
|---|---|---|---|
| 2,784,926 | 3/1957 | Bonza et al. | 244/129.3 |
| 4,201,577 | 5/1980 | Ingersoll et al. | 75/134 N |
| 4,520,364 | 5/1985 | Perry | 343/872 |
| 4,603,090 | 7/1986 | Mizuhara | 428/606 |
| 4,630,767 | 12/1986 | Mizuhara | 428/606 |
| 5,129,990 | 7/1992 | Binnie et al. | 244/121 |
| 5,306,656 | 4/1994 | Corbin et al. | 428/432 |
| 5,407,119 | 4/1995 | Churchhill et al. | 228/124.5 |
| 5,691,736 | 11/1997 | Hunn et al. | 244/121 |

*Primary Examiner*—Galen L. Barefoot

*Attorney, Agent, or Firm*—David W. Collins; Andrew J. Rudd; Glenn H. Lenzen, Jr.

[57] ABSTRACT

A missile has a body with a substantially circular nose opening therein, and a ceramic radome sized to cover the nose opening. A compliant metallic circular "T"-flexure element is disposed structurally between the radome and the body and is integral with the body. A niobium-containing washer is disposed between the radome and the "T"-flexure element. The "T"-flexure element includes an elongated compliant arm region and a cross bar region positioned adjacent the radome such that the niobium-containing washer is situated between a lower margin surface of the radome and an upper side of the crossbar region. A first brazed butt joint is formed between the lower margin surface of the radome and an upper surface of the niobium-containing washer, while a second brazed butt joint is formed between a lower surface of the niobium-containing washer and the crossbar region of the "T"-flexure element. Two separate brazing materials are employed to be compatible with the respective materials (radome and niobium washer; niobium washer and "T"-flexure element), but have substantially the same brazing temperature to permit brazing the radome to the body in a single brazing operation.

16 Claims, 4 Drawing Sheets

VEHICLE HAVING A CERAMIC RADOME AFFIXED THERETO BY A COMPLAINT METALLIC "T"-FLEXURE ELEMENT

CROSS-REFERENCE TO RELATED APPLICATIONS

The present application is related to the following applications: (1) continuation of "Vehicle Having a Ceramic Radome Affixed Thereto by a Compliant Metallic Transition Element", Ser. No. 08/710,051, filed Sep. 10, 1996, now U.S. Pat. No. 5,884,864; (2) continuation of "Vehicle Having a Ceramic Radome Joined Thereto by an Actively Brazed Compliant Metallic Transition Element", Ser. No. 08/711,637, filed Sep. 10, 1996; and (3) continuation of "Vehicle Having a Ceramic Radome with a Compliant, Disengageable Attachment", Ser. No. 08/709,929, filed Sep. 9, 1996, now U.S. Pat. No. 5,758,845.

BACKGROUND OF THE INVENTION

1. Field of the Invention

The present invention relates to a vehicle having a ceramic radome, and, more particularly, to the attachment of the ceramic radome to the vehicle.

2. Description of Related Art

Outwardly-looking radar, infrared, and/or visible-light sensors built into vehicles such as aircraft or missiles are usually protected by a covering termed a radome. The radome serves as a window that- transmits the radiation sensed by the sensor. It also acts as a structural element that protects the sensor and carries aerodynamic loadings. In many cases, the radome protects a forward-looking sensor, so that the radome must bear large aerostructural loadings.

Where the vehicle moves relatively slowly, as in the case of helicopters, subsonic aircraft, and ground vehicles, some radomes are made of nonmetallic organic materials which have good energy transmission and low signal distortion, and can support small-to-moderate structural loadings at low-to-intermediate temperatures. For those vehicles that fly much faster, such as hypersonic aircraft or missiles flying in the Mach 3–20 range, nonmetallic organic materials are inadequate for use in radomes because aerodynamic friction heats the radome above the maximum operating temperature of the organic material.

In such cases, the radome is made of a ceramic material that has good elevated temperature strength and good energy transmission characteristics. However, existing ceramics have the shortcoming that they are relatively brittle and easily fractured. The likelihood of fracture is increased by small surface defects in the ceramic and externally-imposed stresses and strains. The ceramic radome is hermeticlly attached to the body of the missile, which is typically made of a metal with high-temperature strength, such as a titanium alloy.

The ceramic has a relatively low coefficient of thermal expansion (CTE), and the metal missile body has a relatively high CTE. When the missile body and radome are heated, the resulting CTE-mismatch strain between the radome and the missile body can greatly increase the propensity of the radome to fracture in a brittle manner, leading to failure of the sensor and failure of the missile. Such heating can occur during the joining operation, when the missile is carried on board a launch aircraft, or during service.

Thus, there is a need for an approach to the utilization of ceramic radomes in vehicles, particularly high-speed missiles, wherein the tendency to brittle fracture and radome failure is reduced. The present invention fulfills this need, and further provides related advantages.

SUMMARY OF THE INVENTION

The present invention provides a vehicle, such as a missile, having a ceramic radome affixed to the vehicle body. The attachment structure is such that the thermally induced strain in the radome due to thermal expansion coefficient differences is reduced or avoided. The attachment structure itself does not tend to cause premature failure in the ceramic material, as has been the case for some prior attachment approaches. The attachment may be hermetic if desired, so that the delicate sensor is protected against external environmental influences, as well as aerodynamic and aerothermal loadings.

In accordance with the present invention, a vehicle having a ceramic radome comprises a vehicle body having an opening therein and a ceramic radome sized to cover the opening of the vehicle body. The body is thinned in the area of attachment of the radome thereto to provide flexure due to the different coefficients of thermal expansion between the radome material (ceramic) and the body material (metallic). A thin flat metal washer, containing niobium, having been punched into a ring, is then brazed between the thinned body and the radome. The brazing material for brazing the niobium-containing washer to the radome comprises Incusil ABA, while the brazing material for brazing the niobium-containing washer to the vehicle body comprises Incusil-15 or equivalent. The brazing temperatures of the two foregoing Incusil alloys is substantially the same, which permits brazing the ceramic radome to the vehicle body in a single brazing operation, rather than the two separate brazing operations required in the prior art.

As a consequence of (a) thinning the body in the area of attachment and (b) employing a niobium washer between the body and the radome, only one brazing operation need be done, since the alloy used to braze the niobium washer to the thinned body has a brazing temperature about the same as that of a brazing alloy used to braze the radome to the niobium washer. The number of brazing operations is reduced from two to one. Further, the use of a niobium washer, which can be easily punched out of sheet metal, eliminates the need for providing a shaped niobium transition metal ring between the body and the radome. Thus, both time and materials cost are significantly reduced.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
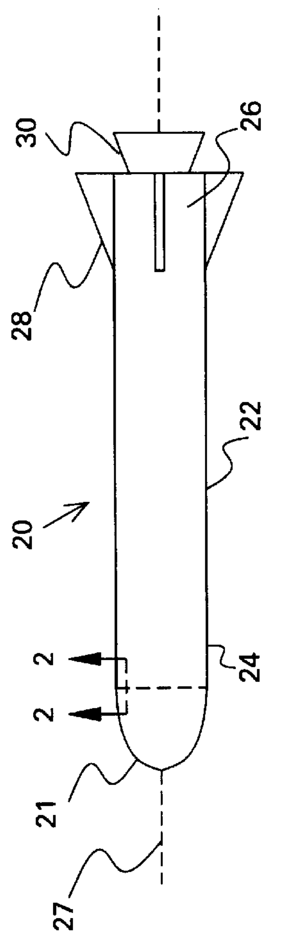
FIG. 1 is an elevational view of a missile with an attached radome.

FIG. 1 depicts a vehicle, here illustrated as a missile 20, having a radome 21 attached thereto. The radome 21 is forwardly facing as the missile flies and is therefore provided with a generally ogival shape that achieves a compromise between good aerodynamic properties and good radiation transmission properties. The missile 20 has a missile body 22 with a forward end 24, rearward end 26, and a body axis 27. The missile body 22 is generally cylindrical, but it need not be perfectly so. Movable control fins 28 and an engine 30 (a rearward portion of which is visible in FIG. 1) are supported on the missile body 22. Inside the body of the missile are additional components that are not visible in FIG. 1, are well-known in the art, and whose detailed construction are not pertinent to the present invention, including, for example, a seeker having a sensor, a guidance controller, motors for moving the control fins, a warhead, and a supply of fuel.

Figure 2:
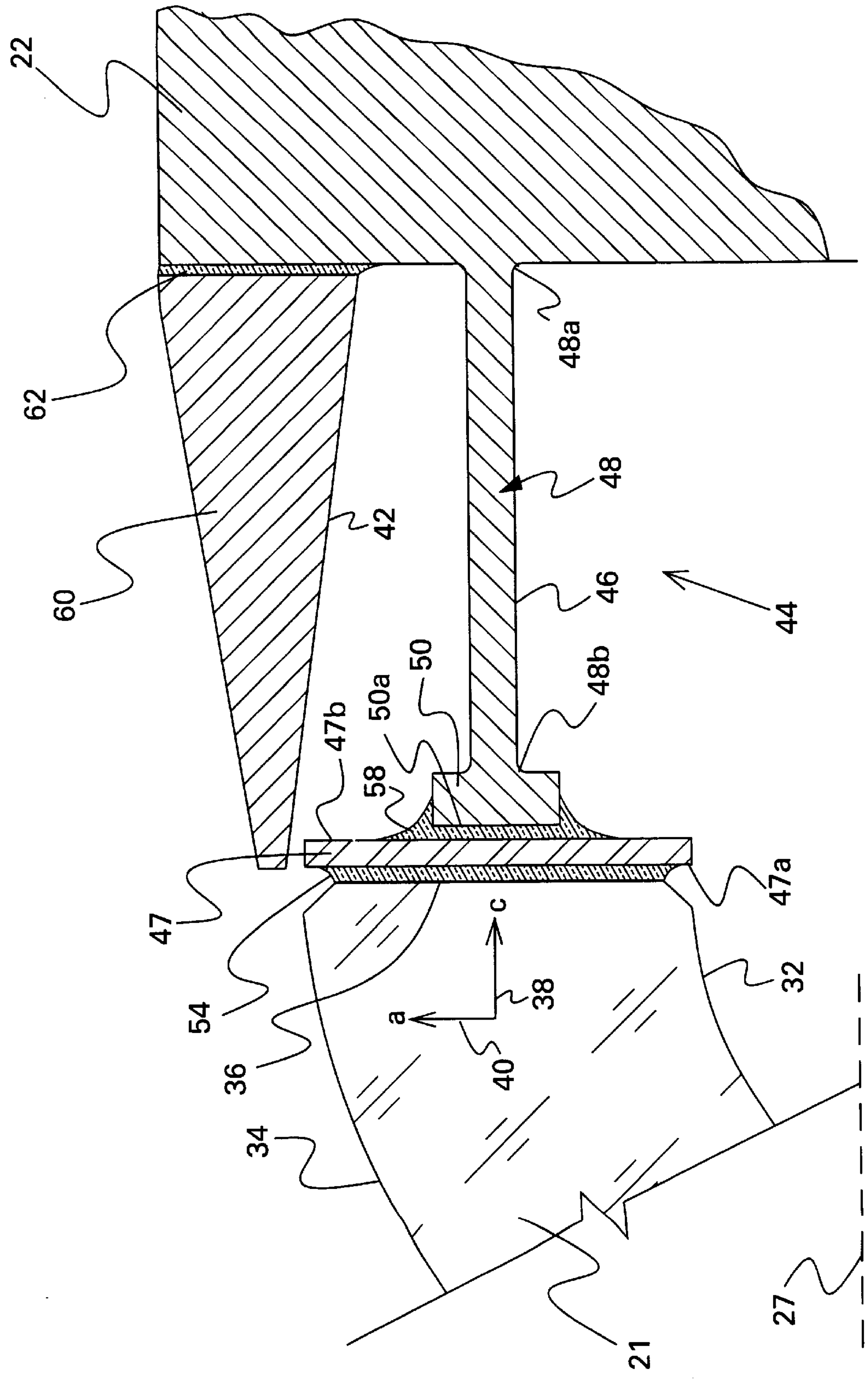
FIG. 2 is a schematic enlarged sectional view of the missile of FIG. 1, taken long line 2—2 in a radome attachment region.

FIG. 2 illustrates a region at the forward end 24 of the missile body 22, where the radome 21 attaches to the missile body 22. The radome 21 has an inside surface 32, an outside surface 34, and a lower margin surface 36 extending between the inner surface 32 and the outer surface 34. The lower margin surface 36 is generally perpendicular to the body axis 27. The radome 21 is made of a ceramic material. Preferably, the radome 21 is made of sapphire, a form of aluminum oxide. For structural reasons, the radome 21 is preferably fabricated with a crystallographic c-axis 38 of the sapphire generally (but not necessarily exactly) perpendicular to the margin surface 36. Thus, in the region of the radome 21 near to the margin surface 36, the crystallographic a-axis 40 of the sapphire is generally (but not necessarily exactly) perpendicular to the inner surface 32 and to the outer surface 34. However, for some applications, the crystallographic orientation of the sapphire may be other than along the a- or c-axis, in order to provide certain structural advantages for aerodynamic loading, such as disclosed, for example, in application Ser. No. 08/914,842, filed Aug. 19, 1997.

The most forward end of the missile body 22 defines a nose opening 42, which in this case is substantially circular because the missile body is generally cylindrical. An attachment structure 44 joins the radome 21 to the missile body 22 in order to cover and enclose the opening 42. The attachment structure includes a compliant "T"-flexure element 46, which is an integral part of the missile body 22. The "T"-flexure element 46 has the form of a ring that extends around the entire opening 42, but is shown in section in FIG. 2.

In section, the "T"-flexure element 46 has a substantially T-shape, and comprises an elongated compliant arm region 48 that extends generally parallel to the body axis 27 of the missile 20. The arm region 48 is secured at one end 48*a* to the missile body 22 and, in fact, is integral with the missile body. A crossbar region 50, secured to the opposite end 48*b*, is perpendicular to the arm region 48 and thence generally perpendicular to the body axis 27. The arm region 48 and the crossbar region 50 are integrally formed as part of the missile body 22. The arm region 48 and the crossbar region 50 preferably extend completely around the circumference of the ring of the "T"-flexure element 46. Essentially, the missile body 22 is thinned in the area of the arm region 48 so as to provide flexure, as described more fully below. The thinning of the arm region 48 is conventional and forms no part of the present invention.

The radome 21 is joined to the "T"-flexure element 46 at a first attachment, through a niobium-containing washer 47. The first attachment is preferably a first brazed butt joint 54 between an upper surface 47*a* of the niobium washer 47 of the "T"-flexure element 46 and the lower margin surface 36 of the ceramic radome 21. The first brazed butt joint 54 is preferably formed using an active brazing alloy which chemically reacts with the material of the radome 21 during the brazing operation.

In forming this butt joint 54, care is taken that the brazing alloy contacts only the lower margin surface 36 of the radome 21, and not its inside surface 32 or its outside surface 34. The molten form of the active brazing alloy used to form the butt joint 54 can damage the inside surface 32 and the outside surface 34 of the radome, which lie perpendicular to the crystallographic a-axis 40 of the sapphire material. The lower margin surface 36, which lies perpendicular to the crystallographic c-axis 38 of the sapphire material, is much more resistant to damage by the active brazing alloy. The use of the butt joint only to the lower margin surface 36 of the sapphire radome thus minimizes damage to the sapphire material induced by the attachment approach.

The use of a butt joint to join the radome 21 to the "T"-flexure element 46 is to be contrasted with the more common approach for forming joints of two structures, a lap or shear joint. In this case, the lap joint would be undesirable for two reasons. The first, as discussed in the preceding paragraph, is that the lap joint would necessarily cause contact of the brazing alloy to the inside and/or outside surfaces of the radome, which are more sensitive to damage by the molten brazing alloy. The second is that the lap or shear joint would extend a distance upwardly along the inside or outside surface of the radome, reducing the side-viewing angle for the sensor that is located with the radome. That is, the further the opaque lap joint would extend along the surface of the radome, the less viewing angle would be available for the sensor. In some applications, this reduction of the side-viewing angle would be critical.

The niobium-containing washer 47 is joined to the "T"-flexure element 46 at a second attachment. The second attachment includes a second brazed butt joint 58 between a lower surface 47*b* of the washer 47 and an upper surface 50*a* of the crossbar region 50.

The missile body 22 is preferably made of a metal such as a titanium alloy. The titanium alloy of the missile body 22 and the sapphire of the radome 21 have different coefficients of thermal expansion (CTE). When the missile 20 is heated and cooled during fabrication or service, this difference in thermal expansion coefficients causes the total expansion of the radome 21 and the missile body 22 to be different. This difference would ordinarily produce thermally induced stresses in the radome 21 and the missile body 22. The thermally induced stresses have relatively small effects on the metallic missile body structure, but they can produce significant damage and reduction in failure stress in the ceramic material of the radome 21. The present approach of the combination of the "T"-flexure element 46 and niobium-containing washer 47 avoids or minimizes such thermally induced stresses.

The "T"-flexure element 46 is made of the same metal or metal alloy as the missile body 22. The arm region 48 is made relatively thin, so that it can bend and flex to accommodate differences in the coefficients of thermal expansion of the missile body 22 and the radome 21. Stated alternatively, the thermally induced stresses are introduced into the arm region 48 of the "T"-flexure element 46 and not into the radome 21. Further, the niobium-containing washer 47 acts as a CTE mismatch bridge between the sapphire dome 21 and the titanium body 22.

Figure 2A:
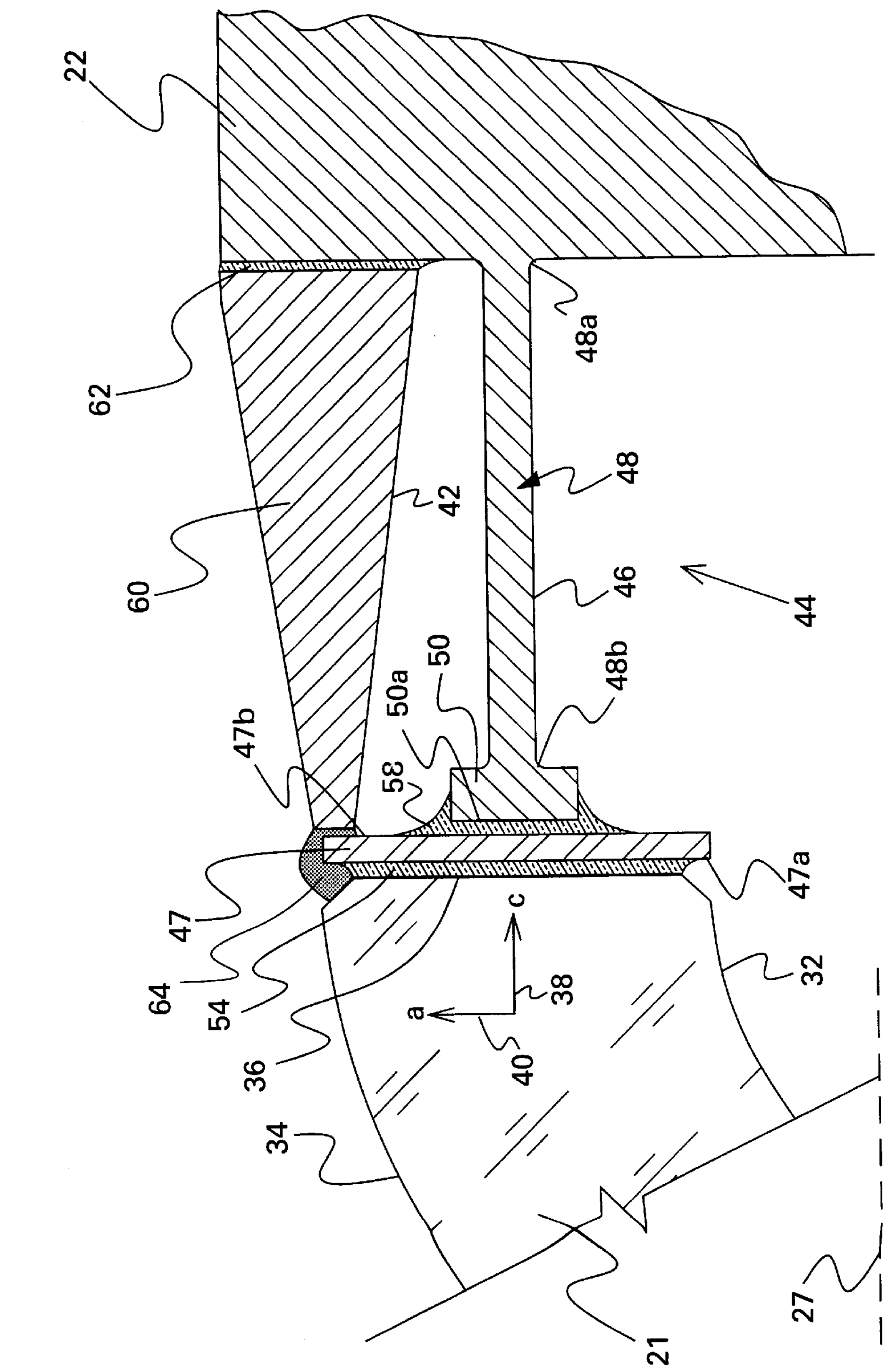
FIG. 2*a* is similar to that of FIG. 2, but illustrating an alternate embodiment.

FIG. 2*a* depicts an alternate embodiment in which an aero ring 60, also shown in FIG. 2, brazed to the missile body 22 with a braze joint 62, is used to protect the "T"-flexure element 46 and niobium-containing washer 47 against aerodynamic stresses and temperatures during flight. In FIG. 2, the aero ring 60 is depicted as spaced from the niobium-containing washer 47, while in FIG. 2*a*, the aero ring is butted against a portion of the bottom surface 47*b* of the washer, and sealed with a heat-resistant polymer 64, such as polysulfide.

Figure 3:
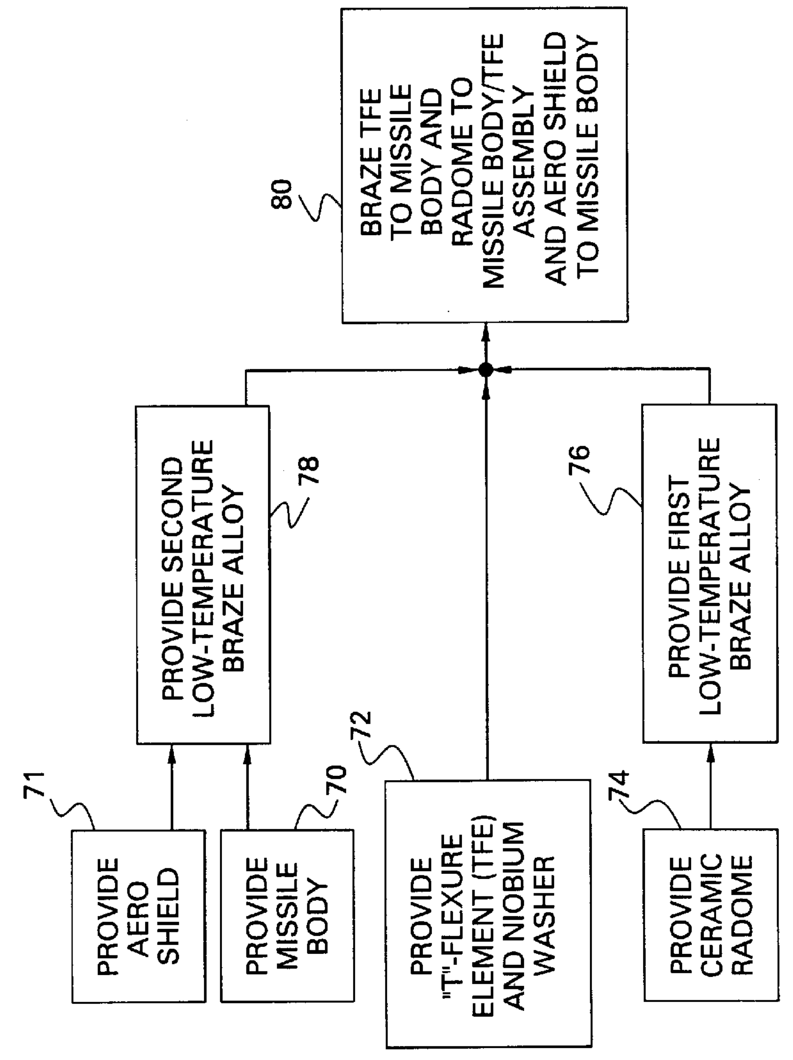
FIG. 3 is a block flow diagram for a method of preparing the missile of FIGS. 1 and 2.

FIG. 3 depicts an approach for fabricating the missile 20 having the radome 21 joined to the missile body 22. The missile body 22 is provided, numeral 70, together with (1) the aero ring 60, numeral 71, (2) the machined, integral "T"-flexure element 46 and niobium-containing washer 47, numeral 72, and (3) the ceramic radome 21, numeral 74. The portion of the missile body 22 that forms the opening 42 and the "T"-flexure element 46 is preferably a titanium alloy such as Ti-6A1-4V, having a composition, in weight percent, of 6 percent aluminum, 4 percent vanadium, balance titanium. The washer 47 is preferably a niobium-based alloy having a composition, in weight percent, of 1 percent zirconium, balance niobium. Other metals or alloys may be employed in place of the niobium-based alloy disclosed, so long as they have a coefficient of thermal expansion that is within about 0.5% that of sapphire and meet other required mechanical properties, such as strength. While examples of such other metals and alloys include tantalum, tantalum-tungsten, and Kovar, such metals and alloys are less preferred than the niobium-based alloy disclosed herein, mainly due to their cost. The niobium-based alloy is further preferred because it is readily available, is easily punched out from sheet stock, and has a coefficient of thermal expansion relatively close to that of the preferred radome material, sapphire.

Relatively low-temperature (approximately 1300° F.) braze alloys are provided to braze the washer 47 to both the ceramic radome 21 and the arm region 48 of the missile body 22, numerals 76 and 78, respectively. The braze alloys are chosen to be compatible with the materials of the missile body 22 (and the "T"-flexure element 46) and the radome 21. Previous approaches have used Gapasil 9 as the preferred braze alloy; see, e.g., above-referenced application Ser. No. 08/710,051. Gapasil 9 is a non-active braze alloy having a composition, in weight percent, of about 82 percent silver, about 9 percent palladium, and about 9 percent gallium, and having a brazing temperature of about 1700° F.

In this prior art approach, a transition metal ring, requiring 0.5 inch of tube stock material and precision machining to meet locating needs, is employed, which requires two separate brazing operations, one to braze the ceramic radome 21 to the transition ring and one to braze the transition ring to the missile body 22.

In accordance with the present invention, Gapasil 9 is replaced with Incusil- 15 or its equivalent. The Incusil-15 braze alloy is used to braze the niobium washer 47 to the titanium "T"-flexure element 46, to form the braze joint 58. Incusil ABA braze alloy is used to braze the sapphire dome 21 to the niobium washer 47, to form the braze joint 54. Incusil-15 and Incusil ABA are registered tradenames of WESGO Inc. Incusil ABA is an active braze alloy having a composition, in weight percent, of about 27.25 percent copper, about 12.5 percent indium, about 1.25 percent titanium, and the balance silver, while Incusil-15 has essentially the same composition as Incusil ABA, less the titanium. Both alloys have a braze temperature of about 1300° F.

The braze alloy is provided in the form of a first braze alloy disk 92 that is placed between the niobium washer 47 and the ceramic radome 21, and a second braze alloy disk 94 that is placed between the niobium washer 47 and the titanium "T"-flexure 46, numerals 76 and 78, respectively. The brazing is accomplished by heating the missile body 22, the "T"-flexure element 46, the niobium washer 47, and the radome 21 with the braze alloy washers 92, 94 therebetween, to a brazing temperature sufficient to melt the braze alloy and cause it to flow freely, about 1330° F., numeral 80. The brazing is accomplished in a vacuum of about $8\times10^{-5}$ Torr or less and with a temperature cycle involving a ramping up from room temperature to the brazing temperature of about 1300° F., a hold at the brazing temperature for 9 minutes, and a ramping down to ambient temperature, the total cycle time being about 5 hours.

Figure 4:
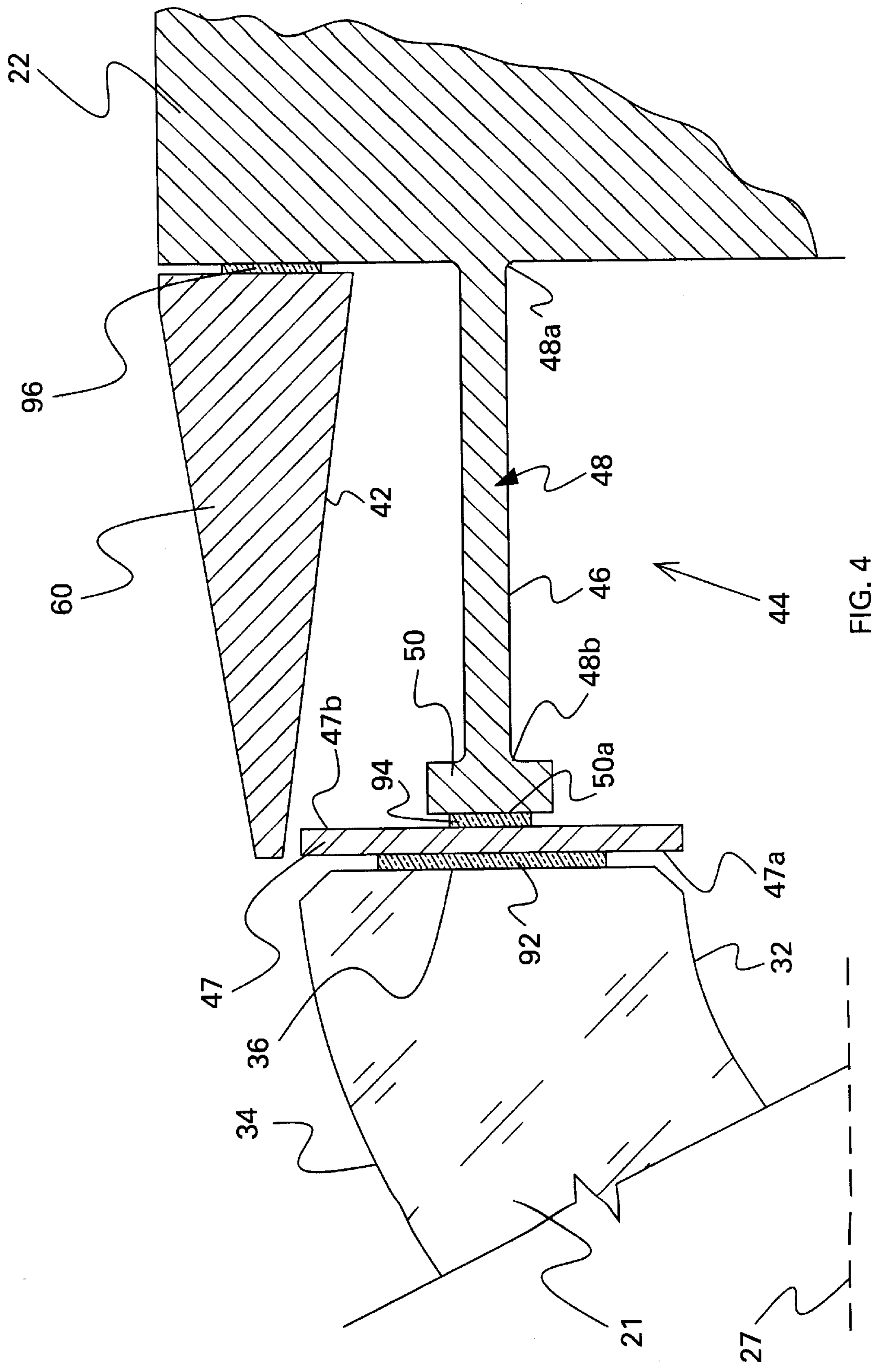
FIG. 4 is a schematic enlarged sectional view similar to FIG. 2, but showing the positioning of the braze alloy pieces prior to the brazing operation.

As noted previously, it is highly desirable that the braze alloy not contact the inside surface 32 or the outside surface 34 of the radome 21, and that the braze alloy only contact the margin surface 36. To achieve this end, the first braze alloy is provided in the form of a flat disk 92 that fits between the margin surface 36 and the upper surface 47*a* of the niobium-containing washer 47, see FIG. 4. The volume of the braze element washer 92 is chosen so that, upon melting, the braze material just fills the region between the margin surface 36 and the niobium-containing washer 47. There is no excess braze alloy to flow onto the surfaces 32 and 34.

Likewise, the second braze alloy is also provided in the form of a flat disk 94 that fits between the lower surface 47*a* of the niobium-containing washer 47 and the upper surface 50*a* of the crossbar region 50.

During the braze operation of joining the ceramic radome 21 to the missile body 22, the aero ring 60 is brazed circumferentially around the titanium "T"-flexure 46, using a brazed butt joint 62 from a flat disk 96 comprising the same composition as the second braze alloy. The aero ring, or element, 60 comprises titanium or titanium alloy and serves to protect the interior brazed joints 54 and 58 during flight and to minimize turbulence. The titanium acts as a heat shield to protect these interior brazed joints 54 and 58 from heat produced by aerodynamic factors during flight. The brazed butt joint 62 is formed during the same brazing operations as the brazed joints 54 and 58.

The joints 54 and 58 are all preferably braze joints, as illustrated. The braze joints are preferred because they form a hermetic seal for the attachment structure 44. The hermetic seal prevents atmospheric contaminants from penetrating into the interior of the missile body during storage. It also prevents gasses and particulate material from penetrating into the interior of the missile body during service. Other operable joint structures and joining techniques may be used.

Although a particular embodiment of the invention has been described in detail for purposes of illustration, various modifications and enhancements may be made with departing from the spirit and scope of the invention. Accordingly, the invention is not to be limited except as by the appended claims.

What is claimed is:

1. A vehicle having a ceramic radome, comprising:

(a) a vehicle body having an opening therein;

(b) the ceramic radome sized to cover the opening of the vehicle body; and (c) an attachment structure joining the radome to the vehicle body to cover the opening, the attachment structure comprising (1) a compliant metallic "T"-flexure element disposed structurally between the radome and the vehicle body, the compliant metallic "T"-flexure element being an integral part of the vehicle body and formed as a part thereof, (2) a niobium-containing washer disposed structurally between the compliant metallic "T"-flexure element and the radome, (3) a first attachment between the radome and the niobium-containing washer, and (4) a second attachment between the metallic "T"-flexure element and the niobium-containing washer.

2. The vehicle of claim 1, wherein the vehicle body is a nose of a missile.

3. The vehicle of claim 1, wherein the radome comprises sapphire.

4. The vehicle of claim 1, wherein the opening is substantially circular, wherein the radome has a substantially circular base sized to join to the opening, and wherein the "T"-flexure element is a ring disposed between the opening and the base of the radome.

5. The vehicle of claim 1, wherein the first attachment and the second attachment are brazed joints.

6. The vehicle of claim 1, wherein the "T"-flexure element includes an elongated compliant arm region and a crossbar region, and wherein a lower margin surface of the radome is affixed to an upper surface of the niobium-containing washer by the first attachment and a lower surface of the niobium-containing washer is affixed to the crossbar region by the second attachment.

7. A vehicle having a ceramic radome, comprising:

(a) a metallic missile body having a substantially circular nose opening therein;

(b) a ceramic radome sized to cover the nose opening, the radome having an outside surface, an inside surface, and a lower margin surface extending between the outside surface and the inside surface;

(c) a compliant metallic circular "T"-flexure element disposed structurally between the radome and the body, wherein the "T"-flexure element includes an elongated compliant arm region and a crossbar region positioned adjacent the radome such that the lower margin surface of the radome rests against an upper side of the crossbar region and wherein the "T"-flexure element is an integral part of the body and is formed as a part thereof;

(d) a niobium-containing washer disposed structurally between the compliant metallic "T"-flexure element and the radome and having an upper surface and a lower surface, (e) a first brazed joint between the lower margin surface of the radome and the upper surface of the niobium-containing washer; and (f) a second brazed joint between the metallic "T"-flexure element and the lower surface of the niobium-containing washer.

8. The vehicle of claim 7, wherein the radome comprises sapphire.

9. The vehicle of claim 7, wherein the radome comprises sapphire having a crystallographic c-axis oriented substantially perpendicular to the margin surface.

10. The vehicle of claim 7, wherein the first brazed joint and the second brazed joint each comprises an active brazing material.

11. The vehicle of claim 10, wherein the active brazing material for the first braze joint comprises about 27.25 wt % copper, about 12.5 wt % indium, about 1.25 wt % titanium, and the balance silver.

12. T he vehicle of claim 10 wherein the active brazing material for the second braze joint comprises about 27.25 wt % copper, about 12.5 wt % indium, and the balance silver.

13. A vehicle having a ceramic radome, comprising:

(a) a metallic missile body having a substantially circular nose opening therein;

(b) a sapphire radome sized to cover the nose opening, the radome having an outside surface, an inside surface, and a lower margin surface extending between the outside surface and the inside surface, the sapphire having a crystallo-graphic c-axis oriented substantially perpendicular to the margin surface;

(c) a compliant metallic circular "T"-flexure element disposed structurally between the radome and the missile body and being integral with the missile body and formed as a part thereof, wherein the "T"-flexure element includes (1) an elongated compliant arm region, and (2) a cross bar region positioned adjacent the radome such that the lower margin surface of the radome rests against an upper side of the crossbar region;

(d) a niobium-containing washer disposed structurally between the compliant metallic "T"-flexure element and the radome and having an upper surface and a lower surface;

(e) a first brazed butt joint between the lower margin surface of the radome and the upper surface of the niobium-containing washer, the first brazed butt joint being formed of a first active brazing alloy; and (f) a second brazed butt joint between the "T"-flexure element and the lower surface of the niobium-containing washer, the second brazed butt joint being formed of a second active brazing alloy.

14. The vehicle of claim 13, wherein the first brazed butt joint is formed of an active brazing alloy having a composition, in weight percent, of about 27.25 percent copper, about 12.5 percent indium, about 1.25 percent titanium, balance silver.

15. The vehicle of claim 13, wherein the second brazed butt joint is formed of a brazing alloy having a composition, in weight percent of about 27.25 percent copper, about 12.5 percent indium, balance silver.

16. A method for preparing a vehicle having a ceramic radome affixed thereto, comprising the steps of:

providing a vehicle body having an opening therein;

providing a ceramic radome sized to cover the opening of the vehicle body;

providing a compliant metallic "T"-flexure element disposed structurally between the radome and the body, the compliant metallic "T"-flexure element being integral with the body and formed as a part thereof;

providing a niobium-containing washer between the compliant metallic "T"-flexure element and the radome; and affixing the radome to the vehicle body using a first brazing alloy disposed between the radome and the niobium-containing washer and a second brazing alloy disposed between the niobium-containing washer and the compliant metallic "T"-flexure element, the first and second brazing alloys having substantially the same brazing temperature so that affixing the ceramic radome to the vehicle body is accomplished in a single brazing operation.

* * * * *